(12) United States Patent
Olesiewicz

(10) Patent No.: US 6,744,628 B2
(45) Date of Patent: Jun. 1, 2004

(54) MULTI-POSITIONABLE POWER DISTRIBUTION UNIT

(75) Inventor: Timothy W. Olesiewicz, Cupertino, CA (US)

(73) Assignee: Sun Microsytems, Inc., Santa Clara, CA (US)

(*) Notice: Subject to any disclaimer, the term of this patent is extended or adjusted under 35 U.S.C. 154(b) by 317 days.

(21) Appl. No.: 10/077,382

(22) Filed: Feb. 15, 2002

(65) Prior Publication Data

US 2003/0155815 A1 Aug. 21, 2003

(51) Int. Cl.$^7$ ................................................. G06F 1/16
(52) U.S. Cl. ....................... 361/687; 361/632; 361/627; 361/641; 307/26; 337/56
(58) Field of Search .......................... 361/622, 601, 361/610, 632, 627, 644, 641, 686, 687, 689, 724–727, 822, 823, 824, 829; 307/26, 38, 66, 65, 41; 16/115, 124; 439/534, 954; 337/56, 91, 72, 130, 155, 348, 358, 167, 145, 146, 338, 340, 87

(56) References Cited

U.S. PATENT DOCUMENTS 5,289,363 A * 2/1994 Ferchau et al. ............. 363/141
5,384,490 A * 1/1995 Swartz, Jr. ................... 307/38
5,870,276 A * 2/1999 Leach et al. ................ 361/627
6,115,822 A * 9/2000 Kim et al. ................... 713/310
6,201,319 B1 * 3/2001 Simonelli et al. ............. 307/26
6,229,691 B1 * 5/2001 Tanzer et al. ............... 361/622
6,535,377 B2 * 3/2003 Carteau et al. ............. 361/632

* cited by examiner

Primary Examiner—Michael Datskovsky
(74) Attorney, Agent, or Firm—Park, Vaughan & Fleming LLP

(57) ABSTRACT

A multi-directional power distribution unit (PDU) provides flexibility in the configuration of a computer system, disk drive array or other enclosure. The power distribution unit may be installed in one orientation for a power feed having a first configuration (e.g., from the front of the enclosure), and may be installed in a second orientation for a power feed in a second configuration (e.g., from the rear of the enclosure). In either orientation, a set of external power connectors couples to one or more external power feeds. Depending on the orientation, either a first or second internal connector will interface with the system or enclosure (e.g., a midplane, a power supply). The PDU may include circuitry for filtering electrical power and may also include a heat sink.

30 Claims, 6 Drawing Sheets

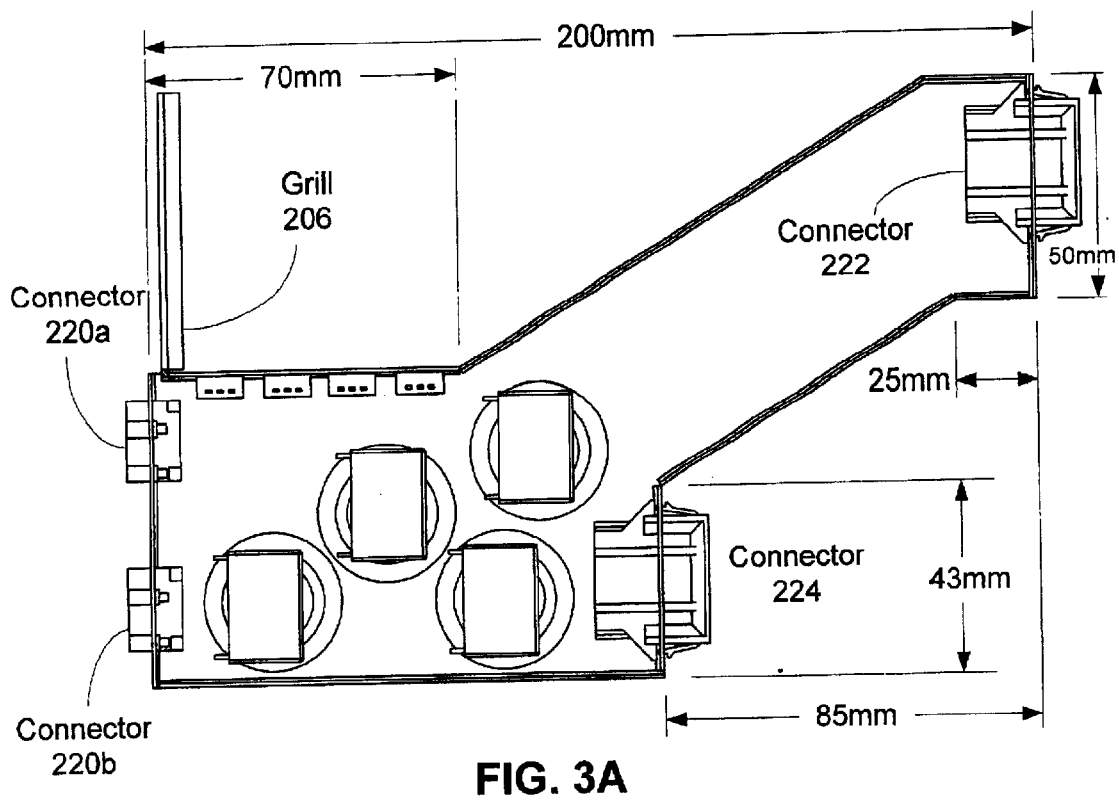
FIG. 3A
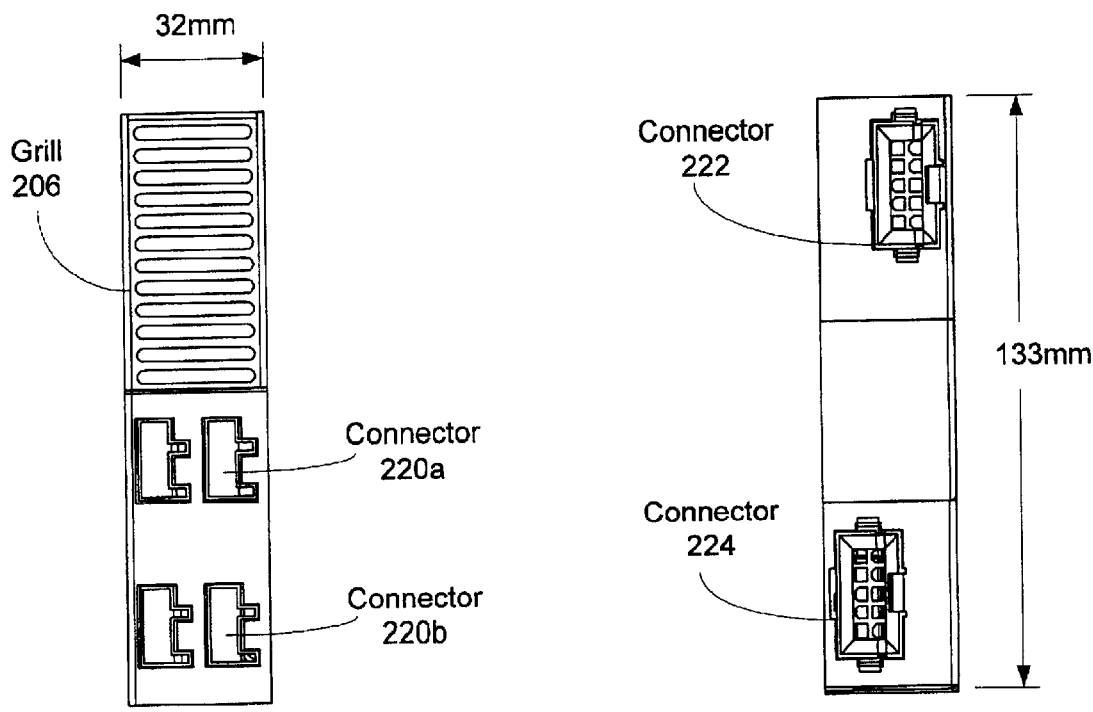
FIG. 3B     FIG. 3C

Multi-Positionable PDU 400

MULTI-POSITIONABLE POWER DISTRIBUTION UNIT

BACKGROUND

This invention relates to the field of electronics. More particularly, a multi-positionable power distribution unit is provided for a computer system or other system of electronic devices, to afford flexibility in the configuration of the system.

Enclosures for computer systems and other electronic systems require access for electrical power for operating the electronic device(s) within the enclosure. In addition to preferences regarding other configuration options (e.g., number or type of devices), different users may have different preferences regarding the configuration of a power feed.

For example, it may be preferable to have an external power feed connect to an enclosure at different points or locations, depending on the orientation of the enclosure when it is installed, whether the enclosure is to be rack-mounted, wall-mounted, floor-mounted, etc. Thus, one user may prefer to have a power feed connect to the rear of an enclosure, while another user may prefer to have it connect to the front.

Presently, in a system or enclosure for which a customer or user may specify different configurations regarding a power feed, the internal configuration of the enclosure will differ accordingly. In particular, a power distribution unit (PDU) for interfacing the system to an external electrical power feed is usually integral to the power supply or designed for installation in a specific position, or with a specific orientation, within the system. The PDU is typically configured to connect to the power feed at just one location (e.g., in the rear of the system). To accommodate a power feed at a different location (e.g., in the front of the system), a different PDU may be required. Thus, a PDU configured to receive a power feed at one access point may not be usable when the power feed is to connect to the system at a different point. Further, if the user's needs change so that it later becomes desirable to alter the system configuration to receive power at the front instead of the rear (or vice versa), the user cannot readily modify the PDU orientation because of its inherent inflexibility.

SUMMARY

Therefore, in one embodiment of the invention, a multi-positionable power distribution unit (PDU) is provided for accommodating a power feed at different locations in an enclosure for a computer or other electronic system.

In this embodiment, the PDU includes a set of external connectors for coupling to one or more external power sources, a first internal connector for transferring power to a power consumer (e.g., a power supply, a midplane) when the multi-positionable PDU is installed in a first position, and a second internal connector for transferring power to a power consumer when the multi-positionable PDU is installed in a second position.

The appropriate position or orientation in which to install the PDU may depend upon where the external power source(s) is/are accessible. For example, if the power is accessed through the front of the system, the PDU may be installed in the first position. But if the power is to be accessed through the rear of the system, then the PDU may be installed in the second position.

In one embodiment, a multi-positionable PDU may comprise circuitry for filtering the power and/or providing an indication to the system when the PDU is connected. Other circuitry may be included for management of multiple power feeds (e.g., to enable detection of a feed, monitor feed status or voltage). The PDU may also include a heat sink to provide cooling of internal circuitry.

DESCRIPTION OF THE FIGURES

FIGS. 3A–C are additional views of the multi-positionable PDU depicted in FIG. 2.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a multi-positionable power distribution unit is provided for use in a computer system, a special purpose system such as a disk drive array, or some other set of electronic equipment. In the following descriptions, one or more details of such systems or devices (e.g., processor, memory, data storage, display) may be omitted for the sake of clarity.

A multi-positionable power distribution unit (PDU), in an embodiment of the invention, is configured for installation in different orientations, depending upon the access point or location of an external electrical power feed. The external feed may provide AC or DC power. The PDU is configured to connect to the external feed to facilitate the transfer of power to an internal consumer, such as a power supply, a midplane or other system board, etc. In one embodiment, the PDU interfaces the power feed to a midplane, to which one or more power supplies are connected.

The PDU may comprise multiple connectors configured to link to the power feed and/or the internal component(s). In this embodiment, the PDU is installed in a first orientation, or position, if the external power feed accesses the system at one point (e.g., the front of the system enclosure), and in a second orientation or position if the power feed accesses the system at a second point (e.g., the rear of the enclosure). Multiple PDUs may be installed in a single system.

Figure 1A:
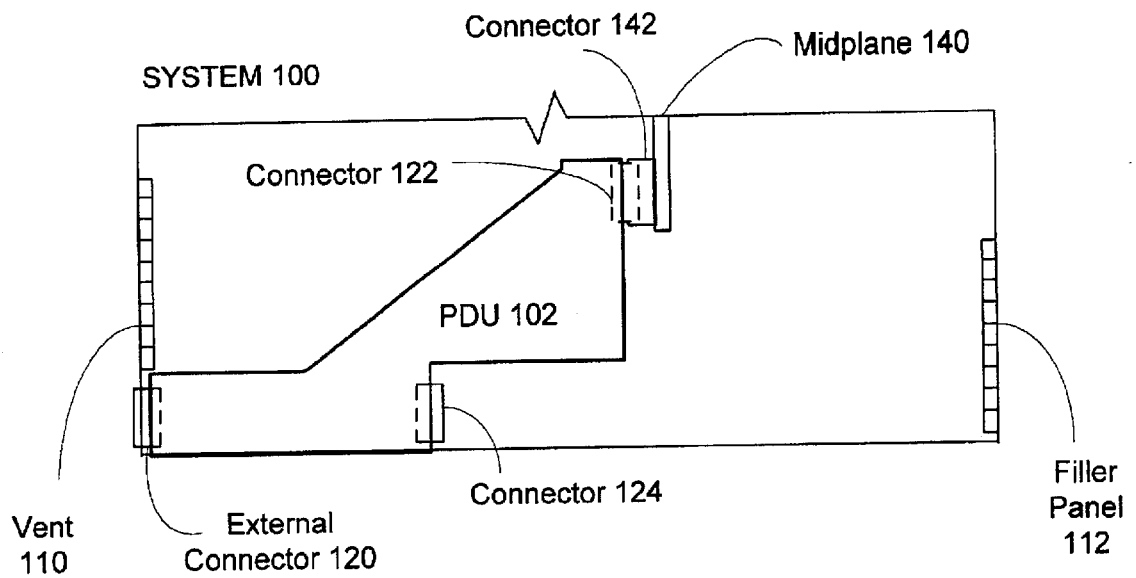
FIGS. 1A–B are block diagrams depicting a multi-positionable power distribution unit (PDU) according to an embodiment of the present invention.
Figure 1B:
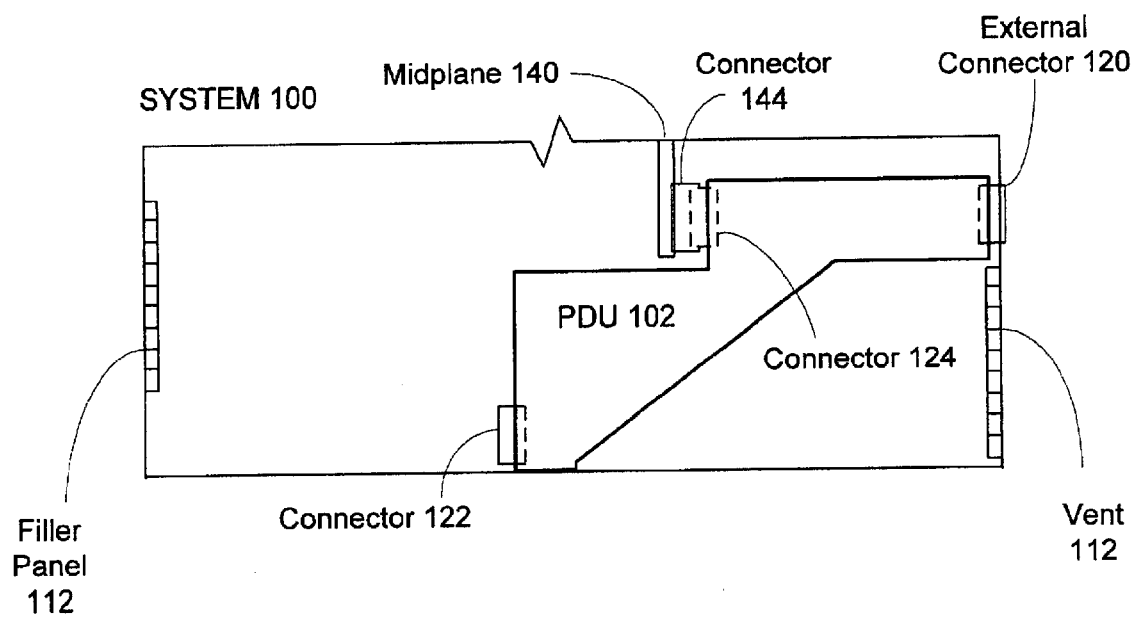

FIGS. 1A–B demonstrate a multi-positionable power distribution unit according to one embodiment of the invention. The configuration (e.g., size, shape) and composition (e.g., number of connectors, internal circuitry or components) of PDU 102 of FIGS. 1A–B are merely illustrative. In other embodiments of the invention, various parameters of a multi-positionable PDU may differ from PDU 102 without exceeding the scope of the invention.

In the illustrated embodiment of the invention, PDU 102 is configured for a compact PCI (Peripheral Component Interconnect), or cPCI, system. Thus, midplane 140 and other parameters of system 100 may be configured according to PCIMG (PCI Industrial Manufacturer's Group) specification 2.0, and/or IEEE (Institute for Electrical and Electronics Engineers) standards 1101.1, 1101.10 and 1101.11, which apply to cPCI systems. For example, midplane 140 is positioned closer to the rear than the front of system 100, to allow 160 mm interface cards to be connected to the front of the midplane, and 80 mm cards to be connected to the rear.

As shown in FIG. 1A, multi-positionable PDU 102 may be installed in a first orientation to receive a first power feed (e.g., at the front of system 100). In this orientation, external connector 120 is positioned at the front of the system to interface with a compatible connector of the external power feed. PDU connector 122 is thereby configured to mate with a first compatible electrical connector of midplane 140, such as midplane connector 142.

In FIG. 1B, multi-positionable PDU 102 is installed in a second orientation to receive a second power feed (e.g., at the rear of system 100). In this alternative orientation, external connector 120 is positioned at the rear of the system. Internally, PDU connector 124 is positioned to mate with a second compatible electrical connector of the midplane, such as connector 144.

In system 100, a power supply (not shown in FIG. 1) may be located underneath and/or adjacent to midplane 140. Vent 110 and filler panel 112, which are optional and may be located elsewhere, facilitate the flow of air through the system. For example, depending on how a multi-positionable PDU is installed (e.g., for a front or rear power feed), vent 110 and filler panel 112 may be configured accordingly. Thus, in FIG. 1A, vent 110 is installed in an area near external connector 120 on the front of system 100. Filler panel 112 is installed in the rear of system 100 (e.g., to cover an alternative PDU installation space). FIG. 1B demonstrates how the location of the vent and filler panel may change when the PDU is installed for a rear power feed.

As may be seen in FIGS. 1A–B, PDU 102 is configured to facilitate multiple operative configurations, without stopping the flow of air through the system.

In one alternative embodiment of the invention, a multi-positionable PDU may be configured with a different number of power connectors for connection to a midplane or other power consumer. For example, if a system midplane were located equidistant from the front and rear of a system, a multi-positionable PDU may be able to connect to the midplane with a single connector regardless of whether it is installed for a front or rear power feed. In another alternative embodiment, a connector of a multi-positionable PDU may be coupled to a power consumer via a power cable, thereby affording additional flexibility.

Figure 2:
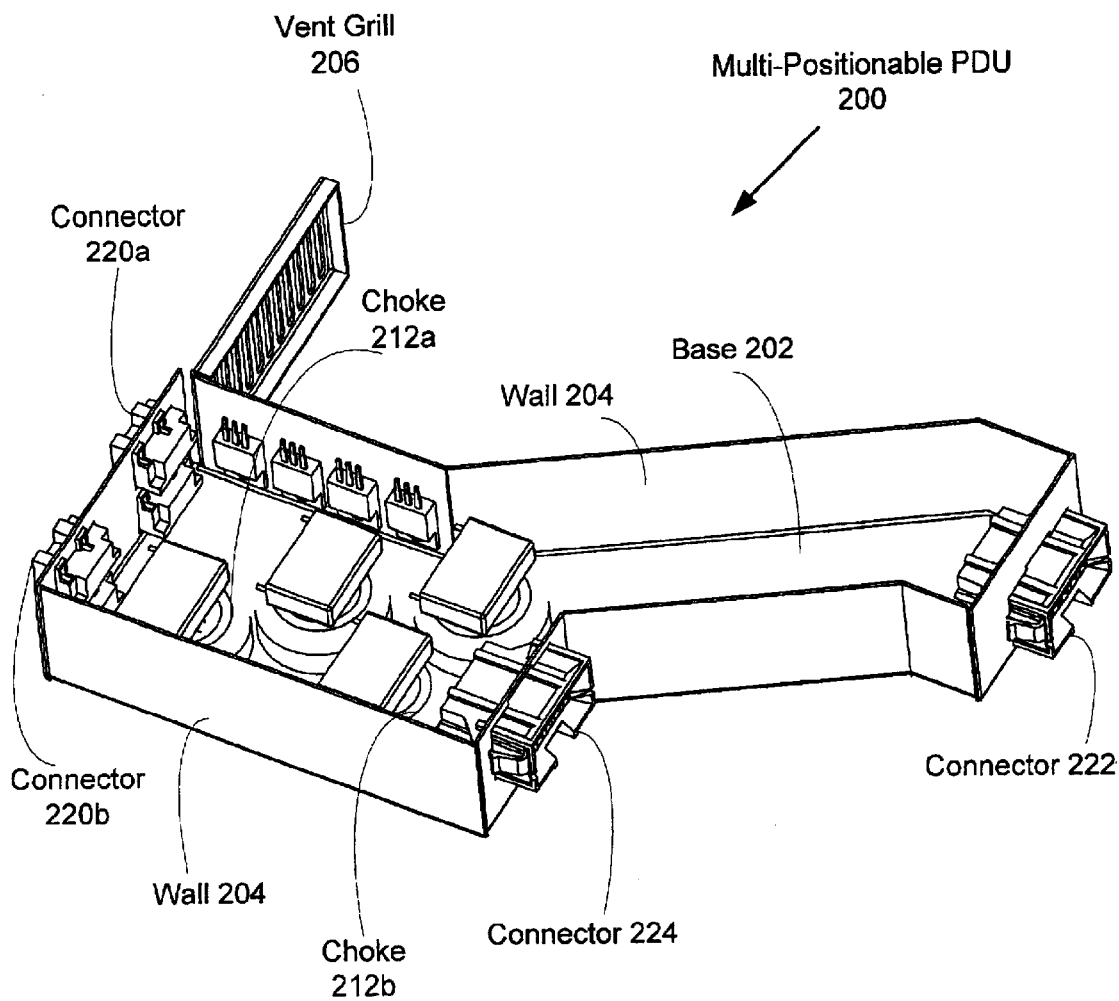
FIG. 2 is a perspective view of a multi-positionable PDU according to an embodiment of the invention.

FIG. 2 is a perspective view of a multi-positionable PDU, according to one embodiment of the invention. In this embodiment, PDU 200 is implemented as a closed interface or conduit for transferring an external power feed to a system midplane, power supply or other component.

PDU 200 of FIG. 2 exhibits a forked proximal, or front, end. One fork, the longer of the two, terminates at connector 222; the other terminates at connector 224. The distal, or rear, end of PDU 200 hosts one or more connectors 220 (i.e., 220a, 220b) for interfacing with one or more external power feeds. In this embodiment, PDU 200 is configured for dual-feed operation, meaning that it can carry multiple power feeds for each internal power supply or other consumer. In other configurations, a multi-positionable power distribution unit may comprise a single external connector 220 for an internal power consumer, or multiple power supplies may be connected to one feed.

PDU 200 includes base 202 and a cover (not shown in FIG. 2) that closes the power distribution unit to help reduce EMI (Electromagnetic Interference) and/or RFI (Radio Frequency Interference). PDU 200 also includes walls 204. Illustratively, a vent or grill, such as grill 206, is attached to PDU 200 in the illustrated embodiment of the invention, but may be omitted in another embodiment.

Connectors 222, 224 may be of any type that is compatible with the corresponding connector(s) of the system in which the PDU is installed. As shown in FIG. 3B, connectors 222, 224 may be horizontally offset from each other. This may be required in an embodiment of the invention in which the multi-positionable PDU 200 is connected to a midplane (e.g., as in FIG. 1). In particular, in such an embodiment the PDU connectors attach to opposite sides of the midplane, and, depending on the thickness of the midplane, it may not be able to host back-to-back connectors. They may therefore be offset horizontally and/or vertically, thereby requiring connectors 222, 224 to be aligned accordingly. The various electrical connectors (connectors 220, 222, 224) of a multi-positionable PDU may be male or female, depending on the corresponding connectors to which they are attached.

As described below, a multi-positionable PDU may include various components for filtering the electrical power it carries and/or for other purposes. In the embodiment of FIG. 2, PDU 200 comprises multiple chokes 212 (212a, 212b) for this purpose. In other embodiments, elements for filtering electrical power may be different, or may be omitted altogether.

FIG. 3A is a side view of multi-positionable PDU 200. The indicated measurements (in millimeters) are merely suggestive, and do not serve to limit the size, shape or any other parameter of a multi-positionable PDU, in this or other embodiments. FIGS. 3B and 3C comprise rear and front views, respectively, of PDU 200. FIG. 3C demonstrates the manner in which connectors 222 and 224 may be horizontally and/or vertically offset from each other, as discussed above. In an alternative embodiment, they may be aligned horizontally and/or vertically.

As demonstrated in FIGS. 2 and 3A–C, a multi-positionable PDU, such as PDU 200, may contain internal wiring or circuitry to facilitate the transfer of electrical power from an external feed, through connector 220, to one or more consumers, through connector 222 or connector 224.

Figure 4:
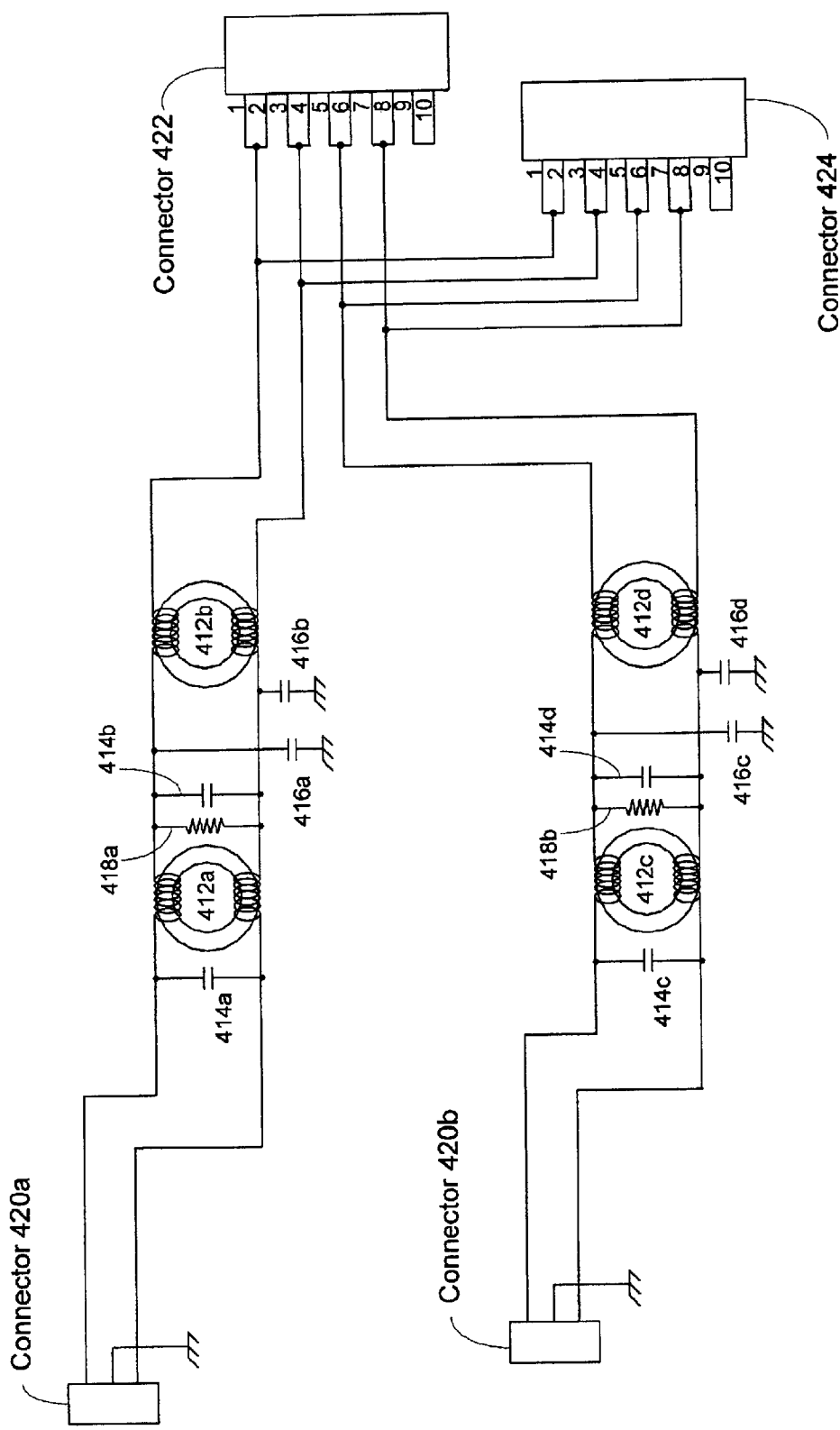
FIG. 4 is a schematic of illustrative filtering circuitry for a single-feed multi-positionable PDU, in accordance with an embodiment of the present invention.

FIG. 4 demonstrates an EMI filter circuit schematic of a multi-positionable PDU for an illustrative single-feed embodiment of the invention, in which an internal power consumer (e.g., power supply) receives a single feed from an external power source.

In PDU 400 of FIG. 4, connectors 420a, 420b are external connectors for connecting the PDU to an external power source. In the illustrated embodiment, the power source provides DC power, and each of connectors 420*a*, 420*b* therefore interfaces with a different battery power source, to provide power to a different internal consumer. Although PDU 400 of FIG. 4 is configured for a DC power feed, a corresponding configuration for AC power may be derived from PDU 400.

Connectors 422, 424 interface PDU 400 to an internal component of the system (e.g., a midplane). Illustratively, pins 9 and 10 of each of connectors 422, 424 may be interconnected to provide the system with the ability to sense connection of the PDU and/or determine which of the connectors 422, 424 is in use. More specifically, pins 9 and 10 may be jumpered together and connected to both ground and a voltage source, and also to a logic circuit (e.g., a diagnostic module) not shown in FIG. 4. If the PDU is not connected to an external power source, then the logic circuit reads a low voltage from ground. Otherwise, the circuit detects a high, indicating that the PDU is connected. The connector (222 or 224) that provides the signal to the logic circuit may be used to identify the orientation of the PDU.

In one alternative embodiment of the invention, additional PDU circuitry may be configured to allow greater diagnostic capability and/or other functions. For example, such additional circuitry may enable monitoring of voltage level(s), identification of part number and/or type, etc. In particular, FRU (Field Replaceable Unit) identification may be provided to an external or remote diagnostic module.

In PDU 400, the external power feeds are filtered to reduce EMI and/or RFI. Thus, the circuitry for transferring the power feeds to the internal consumer(s) includes chokes 412, capacitors 414, 416 and resistors 418.

In the embodiment of FIG. 4, chokes 412*a*–412*d* are rated for 0.65 milli-Henries (mH), capacitors 414*a*–414*d* are rated for 0.33 micro-Farads (uF). Capacitors 416*a*–416*d* are rated for 4.7 nano-farads (nF), and resistors 418*a*, 418*b* are 0.25 watt resistors.

Figure 5:
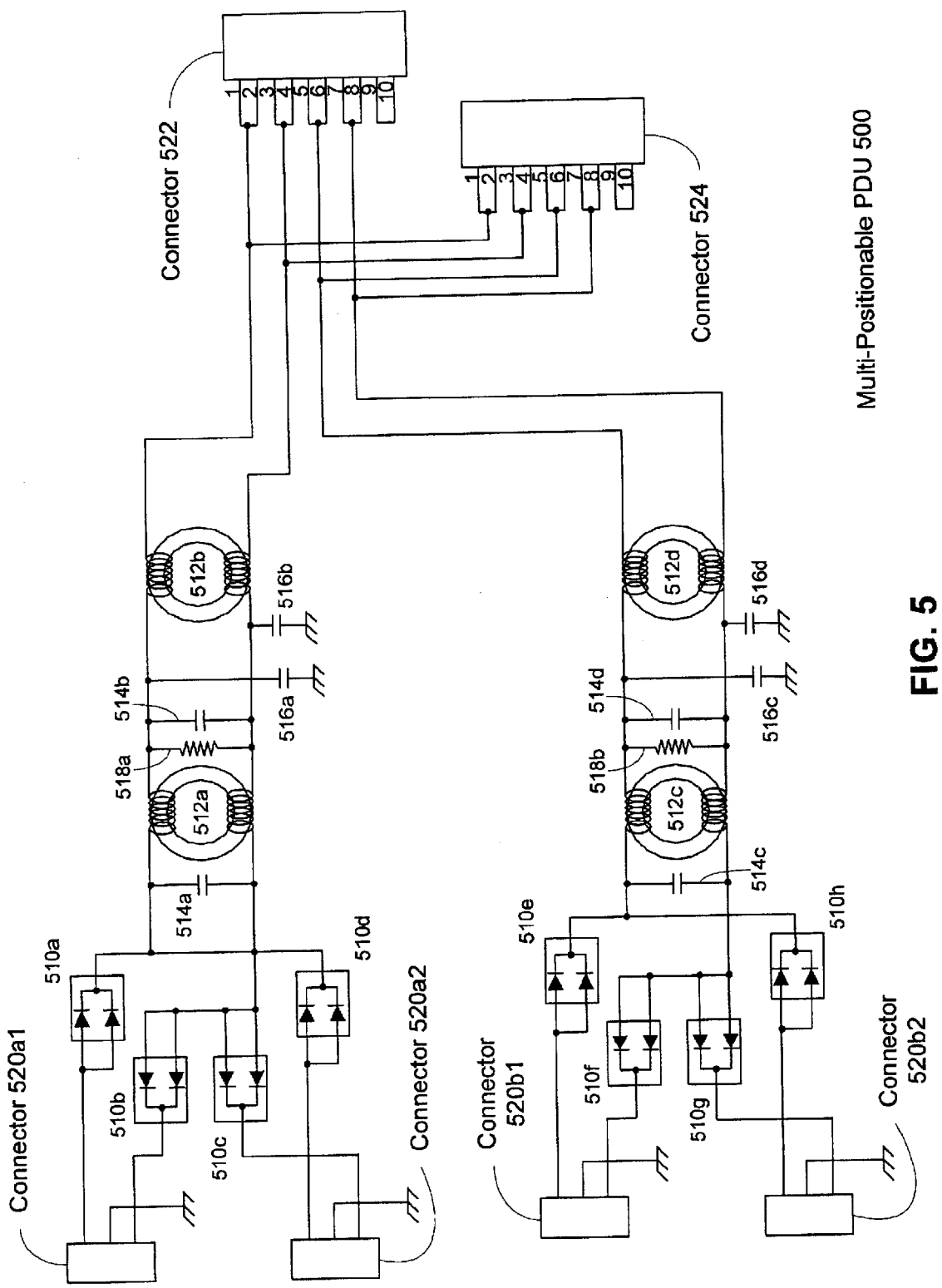
FIG. 5 is a schematic of illustrative circuitry for a multi-feed multi-positionable PDU, in accordance with an embodiment of the invention.

FIG. 5 is a schematic for a multi-positionable PDU for an illustrative dual-feed embodiment of the invention, wherein each power consumer (e.g., power supply) receives two power feeds. Although PDU 500 of FIG. 5 is configured for DC power feeds, a corresponding configuration for AC power may be derived from PDU 500.

In FIG. 5, connectors 520*a*1, 520*a*2 connect to external power feeds for a first power consumer, while connectors 520*b*1, 520*b*2 connect to external feeds for a second consumer. Illustratively, diodes 510 (510*a*–510*h*) are 20-ampere rectifiers. Chokes 512, capacitors 514, 516 and resistors 518 may be configured similarly or identically to the corresponding components of PDU 400 of FIG. 4. And, as discussed above for PDU 400, pins 9 and 10 of connectors 522, 524 may be jumpered to provide sensing.

The number, type and ratings of components depicted in FIGS. 4 and 5 and discussed above are merely illustrative, and may be altered as necessary or as desired for other embodiments of the invention.

Figure 6A:
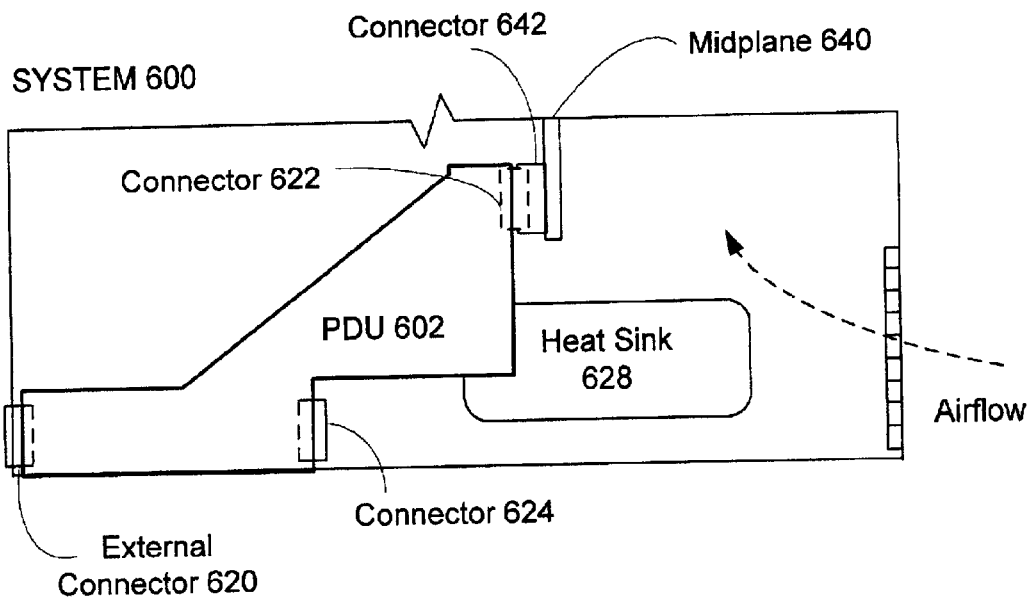
FIGS. 6A–B are block diagrams demonstrating a multi-positionable PDU with heat sinks, according to an embodiment of the invention.
Figure 6B:
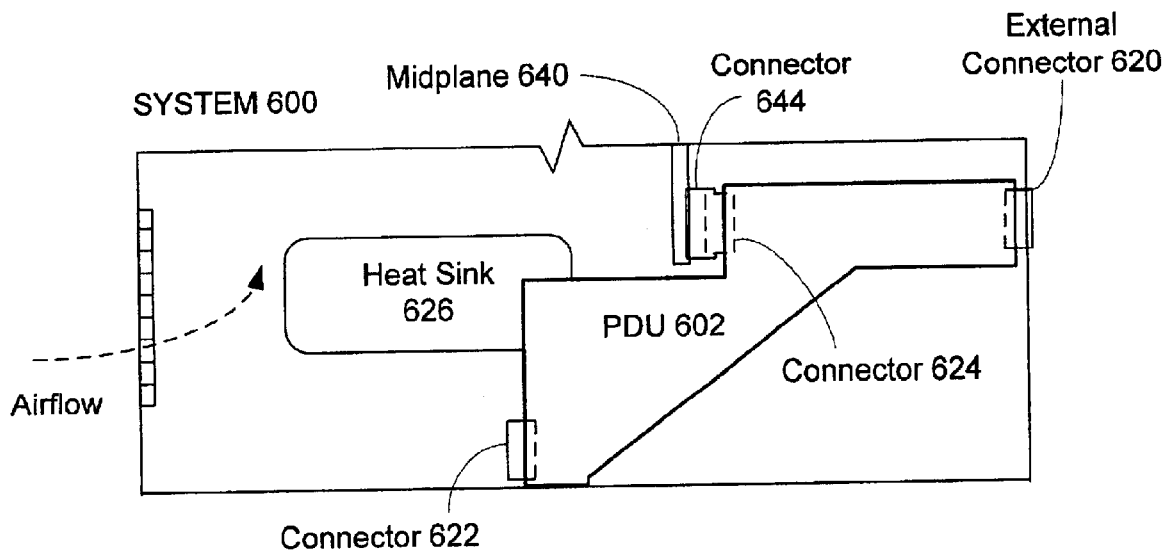

FIG. 6 depicts a multi-positionable PDU comprising a heat sink for dissipating heat generated by internal circuitry, according to one embodiment of the invention. In particular, PDU 602 of system 600 comprises heat sink 626 to alleviate heat caused by circuit elements such as those depicted in FIG. 4 or 5. Heat sink 626 extends from the PDU into the airflow of the system. Because the airflow in system 600 is configured to flow from the side of the system opposite the power feed (i.e., from the rear in FIG. 6A, from the front in FIG. 6B), the heat sink is attached to, or extends from, just one side or surface of PDU 602. In other embodiments of the invention, a heat sink may be configured differently (e.g., regarding size, shape and location).

For example, in one alternative embodiment of the invention, a heat sink may extend from multiple sides or surfaces of a multi-positionable PDU. In this alternative embodiment, regardless of how the airflow is configured (e.g., always from one location regardless of how the PDU is installed), some portion of the heat sink will extend into the airflow.

In another alternative embodiment of the invention, a cable interlock or warning device is provided to prevent a multi-positionable PDU from being removed or uninstalled while an external power feed is connected to the PDU. As one skilled in the art will appreciate, this will help prevent arcing. For example, a mechanical or electromechanical lock (e.g., a solenoid) could be used to tie an internal switch or circuit breaker of a power supply to the PDU. The power supply would therefore have to be shut down before the PDU could be removed.

As another alternative, a micro switch (or other electrical or mechanical switch) may be attached to the PDU, perhaps to an ejector or removal handle. When removal of the PDU is initiated, activation of the switch alerts a logic circuit and the logic circuit may shut down the power supply.

Or, a simple warning device may be employed. For example, if an attempt is made to disconnect a PDU from a midplane power connector or other power consumer without first disconnecting the external power feed, a warning tone or alarm signal may be activated.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A multi-positionable power distribution unit installable in any one of multiple positions within a system of one or more electronic devices, the multi-positionable power distribution unit comprising:

a set of external connectors configured to couple to one or more external sources of electrical power for the system; and a set of internal connectors configured to couple to one or more power consumers within the system;

wherein the multi-positionable power distribution unit is installable in any of multiple operative positions, depending upon a location at which the one or more source of electrical power are to be coupled to said set of external connectors.

2. The multi-positionable power distribution unit of claim 1, further comprising:

circuitry coupling said set of external connectors and said set of internal connectors.

3. The multi-positionable power distribution unit of claim 2, further comprising:

a heat sink for dissipating heat generated by said circuitry.

4. The multi-positionable power distribution unit of claim 2, wherein said circuitry is configured to provide diagnostic information to an external diagnostic module.

5. The multi-positionable power distribution unit of claim 2, wherein said circuitry is configured to filter the electrical power.

6. A multi-positionable power distribution unit, comprising:

a first external connector configured for coupling to a first external power source;

a first internal connector configured to couple to a power consumer when the multi-positionable power distribution unit is placed in a first position; and a second internal connector configured to couple to a power consumer when the multi-positionable power distribution unit is placed in a second position;

wherein the multi-positionable power distribution unit is placed in one of said first position and said second position to facilitate said coupling of said first external connector to the first external power source.

7. The multi-positionable power distribution unit of claim 6, further comprising:

a second external connector configured for coupling to a second external power source.

8. The multi-positionable power distribution unit of claim 6, further comprising:

a first filter circuit configured to filter electrical power received at said first external connector for the first power consumer.

9. The multi-positionable power distribution unit of claim 8, further comprising:

a second external connector configured for coupling to a second external power source; and a second filter circuit configured to filter electrical power received at said second external connector for the first power consumer.

10. The multi-positionable power distribution unit of claim 8, further comprising:

a second external connector configured for coupling to a second external power source; and a second filter circuit configured to filter electrical power received at said second external connector for a second power consumer.

11. The multi-positionable power distribution unit of claim 6, further comprising:

a vent for facilitating airflow.

12. The multi-positionable power distribution unit of claim 6, further comprising:

a heat sink.

13. The multi-positionable power distribution unit of claim 6, wherein the first power consumer is a power supply.

14. The multi-positionable power distribution unit of claim 6, wherein the first power consumer is an interface board.

15. The multi-positionable power distribution unit of claim 6, wherein said first internal connector is configured to generate a signal when said first external connector is coupled to the first external power source.

16. A multi-positionable power distribution unit for installation in any of multiple positions in a system of electronic equipment, comprising:

a first connector configured to interface with the system when the multi-positionable power distribution unit is installed in a first position;

a second connector configured to interface with the system when the multi-positionable power distribution unit is installed in a second position;

a set of external power connectors configured to interface with one or more external power sources when the multi-positionable power distribution unit is installed in either of said first position and said second position; and filtering means for filtering electrical power received at one or more of said external power connectors.

17. The multi-positionable power distribution unit of claim 16, further comprising:

a heat sink configured to dissipate heat.

18. The multi-positionable power distribution unit of claim 16, wherein said set of external power connectors includes a first power connector for coupling to a first external power source and a second power connector for coupling to a second external power source.

19. The multi-positionable power distribution unit of claim 16, wherein:

the multi-positionable power distribution unit is installed in said first position if said external power connectors will couple to the one or more external power sources through a first side of the system; and the multi-positionable power distribution unit is installed in said second position if said external power connectors will couple to the one or more external power sources through a second side of the system.

20. An enclosure defining a substantially closed space for operating one or more electronic devices, the enclosure comprising:

an interface board for interconnecting multiple components of the enclosure;

one or more power supplies; and a multi-positionable power distribution unit configured to transfer electrical power from an external power source for said one or more power supplies;

wherein said multi-positionable power distribution unit is installable in any of multiple positions.

21. The enclosure of claim 20, wherein said multi-positionable power distribution unit is installed in a first position if the external power source will be accessed through a first portion of the enclosure; and wherein said multi-positionable power distribution unit is installed in a second position if the external power source will be accessed through a second portion of the enclosure.

22. The enclosure of claim 20, wherein said multi-positionable power distribution unit comprises:

an external connector configured to couple to the external power source;

a first connector configured to couple to a power consumer when said multi-positionable power distribution unit is installed in a first position; and a second connector configured to couple to a power consumer when said multi-positionable power distribution unit is installed in a second position.

23. The enclosure of claim 22, wherein said power consumer comprises said interface board.

24. The enclosure of claim 22, wherein said power consumer comprises a first power supply.

25. The enclosure of claim 22, wherein said multi-positionable power distribution unit further comprises:

filter circuitry for filtering power received from the external power source.

26. The enclosure of claim 22, wherein said multi-positionable power distribution unit further comprises:
a heat sink.

27. A method of installing a multi-positionable power distribution unit to provide electrical power to a system of electronic devices, comprising:
identifying one of multiple access points of the system for an external power source;
installing the multi-positionable power distribution unit within the system so as to place an external connector of the multi-positionable power distribution unit in proximity to the identified access point;
if the multi-positionable power distribution unit is installed in a first position, coupling a first connector of the multi-positionable power distribution unit to a system component; and
if the multi-positionable power distribution unit is installed in a second position, coupling a second connector of the multi-positionable power distribution unit to a system component.

28. The method of claim 27, further comprising coupling the external power source to said external connector.

29. The method of claim 27, wherein the system component is a midplane.

30. The method of claim 27, wherein the system component is a power supply.

* * * * *